United States Patent [19]

Chomet

[11] 4,082,921
[45] Apr. 4, 1978

[54] AUTOMATIC SUBSCRIBER INTERROGATION SYSTEM

[75] Inventor: Marc Chomet, East Northport, N.Y.

[73] Assignee: Teleglobe Pay-TV System, Inc., Rego Park, N.Y.

[21] Appl. No.: 787,363

[22] Filed: Apr. 14, 1977

[51] Int. Cl.² .................... H04M 11/00; H04Q 9/12
[52] U.S. Cl. .................................. 179/2 A; 340/151
[58] Field of Search ...................... 179/2 A; 340/151

Primary Examiner—George G. Stellar
Attorney, Agent, or Firm—Marianne Rich

[57] ABSTRACT

The computer at the central office is connected to the automatic answering system either with or without ringing the subscriber's telephone. Tones sent by the computer to the subscriber system are filtered and compared to a reference signal and a connect signal is furnished when the comparator outputs indicate that the tones signifying the particular billing system have been received. The connect signal energizes a relay which connects the billing system to the telephone line. A holding circuit for the relay is also energized. A first time delay circuit furnishes a signal to start data transmission from the billing system to the computer a short time after receipt of the connect signal. A billing system furnishes an "access complete" signal deenergizing the holding circuit when billing data transmission is complete. To prevent voice signals from activating the comparators, an untuned differential amplifier has an input connected to the telephone line and furnishes a variable reference signal to the tone comparators, the output of the differential amplifier being less than the output of the filters when the correct tones are received and exceeding the output of the filters upon receipt of voice signals.

7 Claims, 2 Drawing Figures

BLOCK DIAGRAM OF AUTO-ANSWER CIRCUIT

VARIABLE THRESHOLD CIRCUIT

AUTOMATIC SUBSCRIBER INTERROGATION SYSTEM

BACKGROUND OF THE INVENTION

The present invention relates to systems which provide automatic connection of subscriber equipment to a communications network under control of a computer at a central station. It further relates to systems wherein automatic data transmission from the subscriber equipment to the central computer follows such connection and the connection is to be automatically broken upon completion of the data transmission. More particularly, the present invention relates to such equipment when the communications network is a telephone network and the subcriber's equipment is interconnected with a telephone.

SUMMARY OF THE INVENTION

The present invention is an interrogation system for automatically connecting and disconnecting subscriber equipment to and from a communications network at a terminal of said network. When so connected, the subscriber's equipment is adapted to transmit data over the communications network in response to a "data transmit" signal and is adapted to furnish an "access complete" signal upon completion of data transmission. The interrogation system comprises transmitter means at a sending location for sending a plurality of identification signals together identifying a particular subscriber's equipment through said communications network to said station. At the station, means are provided for furnishing a connect pulse only in response to reception of all of said identification signals. Connector means having a first pair of contacts for connecting said equipment to said communications network when closed, a second pair of contacts, and control means for maintaining said first and second pair of contacts in a closed or open state when, respectively energized or deenergized, are provided. Means are provided for connecting the control means to the connect signal furnishing means. Holding circuit means are connected to said control means through said second pair of contacts and are connected to said subscriber equipment, for maintaining the energization of said control means following the end of said connect pulse until receipt of said "access complete" signal. Time delay means are connected to said means for furnishing said connect signal. The time delay means furnish said data transmit signal to said subscriber equipment at a predetermined time interval following receipt of said connect signal.

Second time delay means are provided which are connected to said connect signal furnishing means, for deenergizing said control means after a predetermined time delay following receipt of said control signal, said predetermined time delay being sufficiently long for data transmission to have been completed.

In a preferred embodiment of the present invention, the connect signal furnishing means comprises a plurality of filter means corresponding in number to said plurality of identification signals. Further, the connect signal furnishing means comprises comparator means for comparing the amplitude of said filter output signals to the amplitude of a reference signal. In a preferred embodiment of the present invention, the communications network is a telephone network and the reference signal is a variable reference signal varying as a function of the complete audio input to the access system, thereby preventing the furnishing of the connect signal in response to voice input.

The novel features which are considered as characteristic of the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENT

Figure 1:
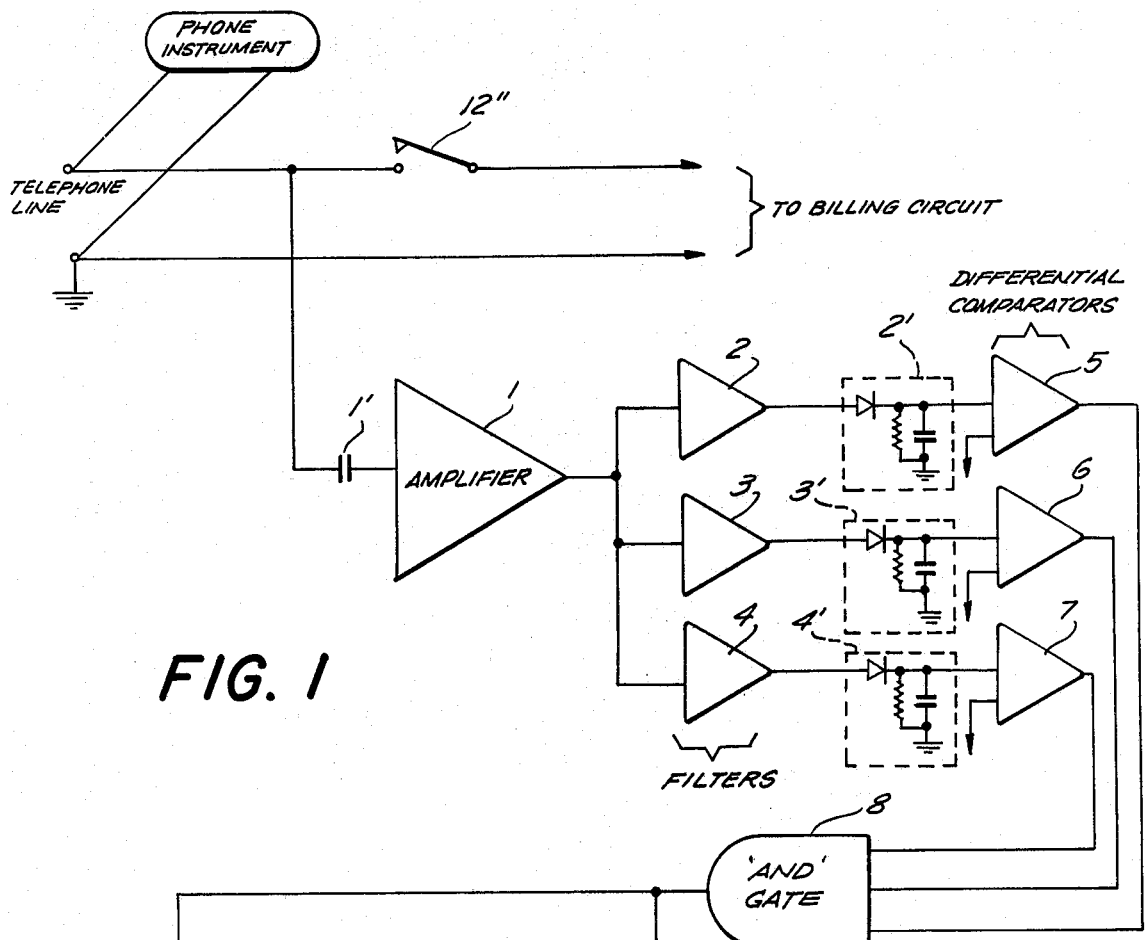
FIG. 1 is a block diagram of the access system of the present invention.

In FIG. 1, the input of an amplifier 1 is permanently connected to the telephone line through a capacitor 1'. The reactance of capacitor 1' together with the input impedance of amplifier 1 prevent damage to the amplifier by the ringing voltage. The output of amplifier 1 is connected to filters 2, 3 and 4, each of which is tuned to a different frequency. The filters may be active or passive filters. The output of filter 2 is connected through a rectifier and integrator circuit 2' to one input of a comparator 5, while the outputs of filters 3 and 4 are similarly connected through rectifiers and integrators 3' and 4' to one input of comparators 6 and 7 respectively. The outputs of comparators 5, 6 and 7 are connected to input of an AND gate 8 whose output is herein referred to as a "connect" pulse.

The connect pulse is applied through a diode 9 and a resistor 10 to the base of a transistor 11. The emitter of transistor 11 is connected to ground potential, while the collector is connected to one terminal of a relay 12 whose other terminal is connected to a positive voltage source indicated by Vcc. The cathode of diode 9 is also connected to ground potential through a resistor 13.

A pair of contacts 12' connects the anode of a diode 14 to the output of an AND gate 14 when closed. The cathode of diode 14 is connected to the cathode of diode 9. One input of an AND gate 14 is the "access complete" signal furnished by the billing system as will be described below. The other input of AND gate 14 is connected to the output of a time delay 15, whose input is connected to the output of AND gate 8. The output of AND gate 8 is also connected to the input of a time delay 16 whose output constitutes the "data transmit" signal.

The above-described circuit operates as follows: Connection to the subscriber's telephone is established either by direct dialing from, for example, the central office of a pay television system which desires to collect billing information from its subscribers. The telephone may also be accessed by an automatic system which makes a connection to the subscriber's line without ringing his telephone. Such systems are known and do not constitute part of the present invention. It is only intended that the present invention operates compatably both with this type of automatic interrogation system and with a direct dialing system. If the interrogation is carried out by direct dialing, the subscriber picks up the telephone and is told that billing and data transmission will take place. Identification signals, which, in a preferred embodiment, comprise three tones of different frequencies, are then transmitted from the central computer of the pay TV station. They are received, and buffered and amplified in amplifier 1. The output of amplifier 1 is then applied to filters 2, 3 and 4, each of which is tuned to the frequency of one of the identification signals. The output of the filters is rectified and integrated in units 2', 3' and 4' and applied to one input of the respective comparators 5, 6 and 7. The second input of each of the comparators, herein referred to as the comparator input, receives either a fixed voltage indicated by V in FIG. 1 or the output of the variable reference signal furnishing circuit shown in FIG. 2. This will be discussed in greater detail below.

Whenever the amplitude of the filter output signal exceeds the amplitude of the reference signal applied to a particular comparator by a predetermined amount, the comparator furnishes a comparator output signal. The comparator output signals are applied to the inputs of an AND gate 8, herein referred to as logic circuit means, which furnishes a positive pulse herein referred to as a "connect" signal upon receipt of signals from all comparators.

The positive pulse from AND gate 8 drives transistor 11 to saturation, causing relay 12 to be energized. Energization of relay 12 causes contacts 12' and 12" to close. Closing of contacts 12" causes the billing circuit to be connected to the telephone line.

Since the output of AND gate 14 is normally positive, the closing of contacts 12' causes the energization of relay 12 to be maintained. The output of AND gate 14 is normally positive since both inputs are normally positive. The "access complete" signal is a logic 0 signal, that is, the normally positive input to AND gate 14 is changed to a zero or negative input upon receipt of the "access complete" signal. Similarly, the output of time delay circuit 15 is normally positive. Receipt of a positive connect pulse causes the output of a negative terminate signal after a predetermined time delay. Specifically, the terminate signal is a negative pulse whose pulse width exceeds the dropout time of relay 12, while the time delay between the negative pulse at the output of time delay 15 and its positive input is sufficiently large to assure that all data transmission between the central computer and the subscriber equipment has been completed, so that under normal circumstances the "access complete" signal will have already been furnished.

Figure 2:
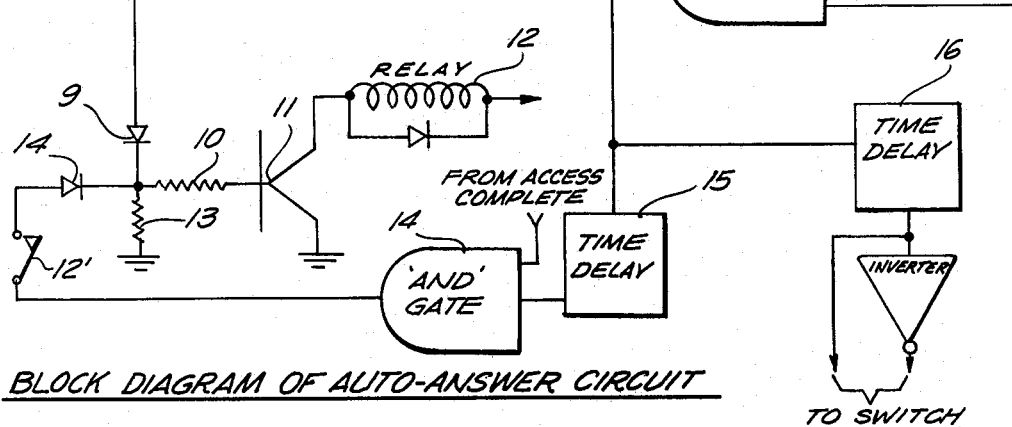
FIG. 2 shows a circuit for furnishing a variable reference signal to the comparators of FIG. 1.
Figure 2:
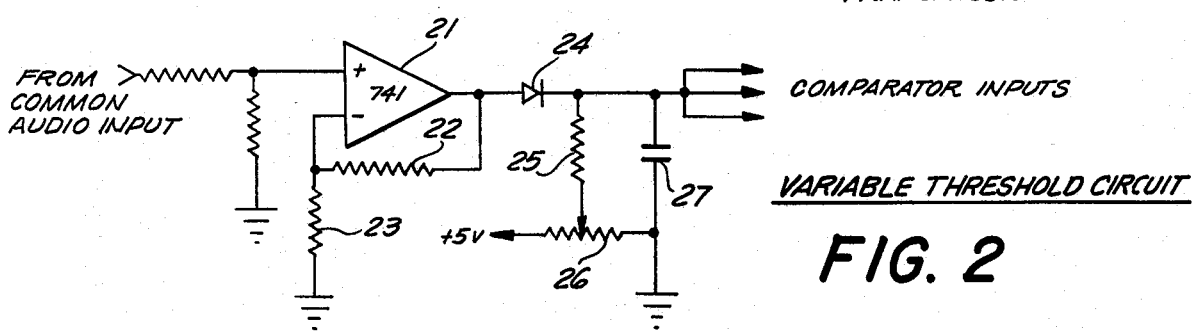

Using only the circuit shown in FIG. 1, with a fixed reference voltage applied to the comparator inputs of comparator circuits 5, 6 and 7, it is possible that a voice input to the telephone could activate the billing system. To prevent this, the circuit of FIG. 2 is utilized. The input of the circuit shown in FIG. 2 is connected to the output of amplifier 1. The total audio input is this applied to the direct input of a operational amplifier 21. The output of amplifier 21 is fed back to its inverting input through a resistor 22. The inverting input of amplifier 21 is also connected to ground potential through a resistor 23. The output of operational amplifier 21 is connected to the anode of a diode 24 whose cathode is connected to the comparator inputs of comparator 5, 6 and 7 of FIG. 1. The cathode of diode 24 is also connected through a resistor 25 to the tap of a potentiometer 26 and through a capacitor 27 to one fixed terminal thereof. The other fixed terminal of potentiometer 26 is connected to a D. C. voltage source. In operation, the total voice input on the telephone line is thus applied to the input of amplifier 21 and is amplified and rectified prior to being applied to the comparator inputs. The time constant of the amplifier is less than that of the filter - rectifier combination of FIG. 1 so that, for a voice input, the voltage at the comparator input will have an amplitude exceeding that of the rectified filter out-puts. Potentiometer 26 provides an adjustment for the amplitude of voltage applied to the comparator inputs. This adjustment is so set that, upon receipt of the correct identification signals, the rectified filter output of filters 2, 3 and 4 will exceed the rectified output of the operational amplifier. Receipt of the identification signals will therefor result in the furnishing of the connect pulse, as required.

It is seen that the above system provides simple, reliable apparatus for automatic telephone interrogation which is not subject to erroneous activation by voice input to the telephone.

While the invention has been illustrated in preferred embodiments, it is not to be limited to the circuits and structures shown since many variations thereof will be evident to one skilled in the art and are intended to be encompassed in the present invention as set forth in the following claims.

I claim:

1. Interrogation system for automatically connecting and disconnecting subscriber equipment from a terminal of a communications network, comprising, in combination, central computer means at a sending location; transmitter means connected to said central computer means for sending a plurality of identification signals together identifying said equipment through said communications network to said terminal; at said terminal: connect signal furnishing means permanently connected to said terminal for furnishing a connect pulse only in response to reception of all of said identification signals; connection means having a first pair of contacts for connecting said subscriber equipment to said communications network when closed, a second pair of contacts, and control means for maintaining said first and second pair of contacts in a closed or open state when, respectively, energized or deenergized; means for connecting said control means to said connect signal furnishing means for energization by said connect pulse; time delay means connected to said connect signal furnishing means and said subscriber equipment, for furnishing a "data transmit" signal to said subscriber equipment a predetermined time interval following receipt of said connect signal, thereby initiating data transmission from said subscriber equipment to said central computer means; wherein said subscriber equipment is adapted to furnish an "access complete" signal when said data transmission has been completed; and further comprising holding circuit means connected to said control means through said second pair of contacts and connected to said subscriber equipment, for maintaining the energization of said control means following the end of said connect pulse and discontinuing said energization upon receipt of said "access complete" signal.

2. A system as set forth in claim 1, further comprising additional time delay means interconnected between said connect signal furnishing means and said holding circuit means, for furnishing a terminate signal to said holding circuit means a predetermined time delay following receipt of said connect pulse; and wherein said holding circuit means comprises means for deenergizing said control means in response to said terminate signal.

3. A system as set forth in claim 2, wherein said control means comprises a relay coil; wherein said holding circuit means comprising an AND gate having a first input for receiving said "access complete " signal and a second input for receiving said terminate signal; and wherein said AND gate has a positive output for energizing said relay coil in the absence of said "access complete" signal and said terminate signal.

4. A system as set forth in claim 1, wherein said connect signal furnishing means comprises a plurality of filter means corresponding in number to said plurality of identification signals, each for furnishing a filter output signal in response to a corresponding one of said identification signals; comparator means connected to the output of said filter means, for comparing each of said filter output signals to a reference signal and furnishing a comparator output signal only when the amplitude of said filter signal exceeds the amplitude of said reference signal; and logic circuit means connected to the output of said comparator means for furnishing said connect signal only in response to comparator output signals indicative of reception of all of said identification signals.

5. A system as set forth in claim 4, wherein said comparator means comprises means for comparing each of said filter output signals to a fixed reference signal, and means for furnishing said fixed reference signal.

6. Equipment as set forth in claim 4, wherein said communications network is a telephone network; further comprising a telephone at each of said stations and means for connecting said telephone to said connect signal furnishing means in such a manner that said connect signal furnishing means responds to the audio input of said telephone; wherein said comparator means has a comparator input for receiving said reference signal; further comprising means for furnishing a variable reference signal having an amplitude varying as a function of said audio input of said telephone to said comparator input of said comparator means.

7. Equipment as set forth in claim 6, wherein said filter means has a predetermined time constant; wherein said means for furnishing a variable reference signal comprises a difference amplifier having a time constant less than said predetermined time constant, whereby the output of said difference amplifier increases at a faster rate than the output of said filter means; and wherein said differences amplifier has a bandpass covering substantially the complete audio range.

* * * * *